Figure 1:
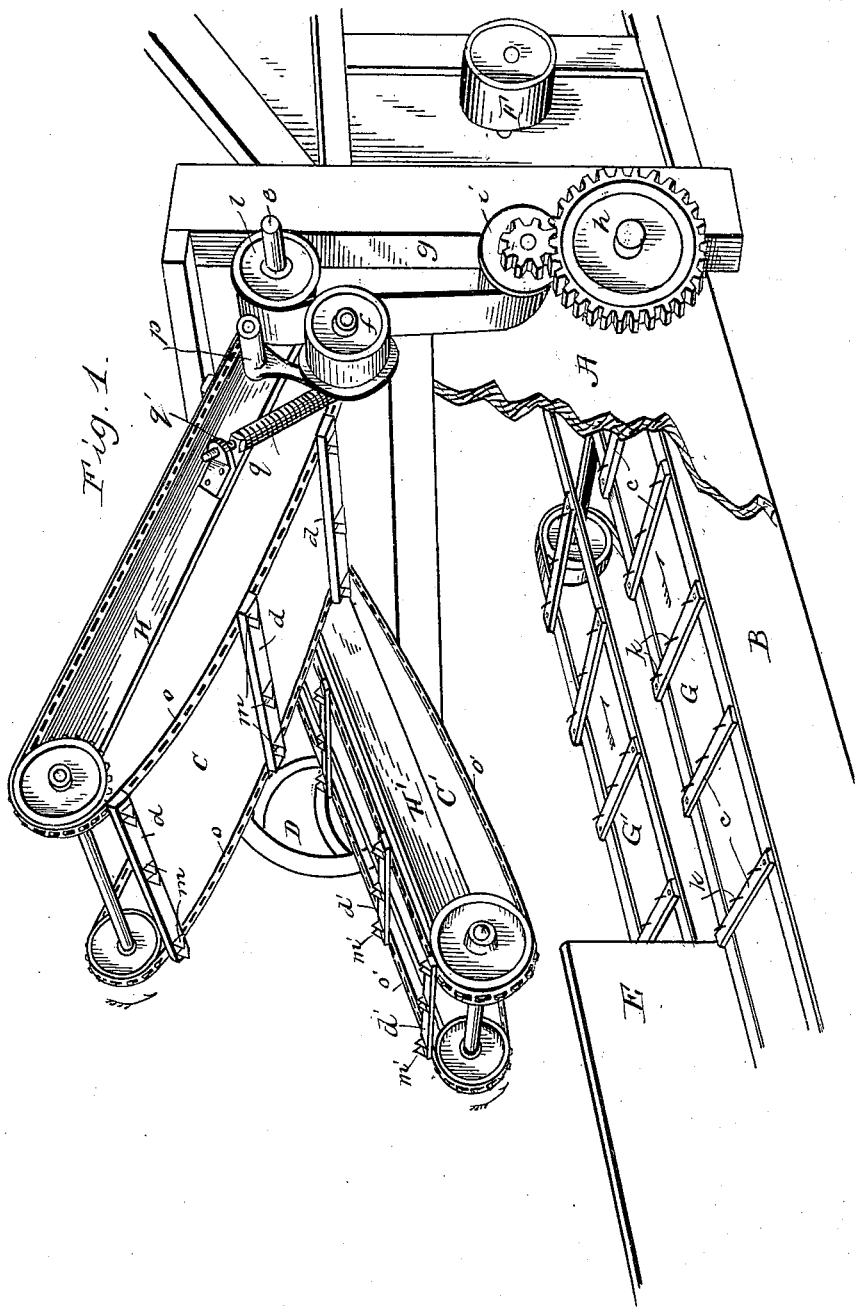

No. 651,066. Patented June 5, 1900.
G. F. CONNER.
BAND CUTTER AND FEEDER FOR THRESHING MACHINES.
(Application filed Feb. 14, 1899.)
(No Model.) 2 Sheets—Sheet 1.

WITNESSES. INVENTOR.
George F. Conner
by L. S. Bacon
Assoc. Attorney

No. 651,066. Patented June 5, 1900.
G. F. CONNER.
BAND CUTTER AND FEEDER FOR THRESHING MACHINES.
(Application filed Feb. 14, 1899.)
(No Model.) 2 Sheets—Sheet 2.

WITNESSES. INVENTOR.
George F. Conner
by F. S. Bacon
Assoc. Attorney

UNITED STATES PATENT OFFICE.

GEORGE F. CONNER, OF PORT HURON, MICHIGAN, ASSIGNOR OF ONE-HALF TO THE PORT HURON ENGINE AND THRESHER COMPANY, OF SAME PLACE.

BAND-CUTTER AND FEEDER FOR THRESHING-MACHINES.

SPECIFICATION forming part of Letters Patent No. 651,066, dated June 5, 1900.

Application filed February 14, 1899. Serial No. 705,472. (No model.)

*To all whom it may concern:*

Be it known that I, GEORGE F. CONNER, a citizen of the United States, residing at Port Huron, in the county of St. Clair and State of Michigan, have invented certain new and useful Improvements in Band-Cutters and Feeders for Threshing-Machines, of which the following is a specification.

My invention relates to improvements in band-cutters and feeders for threshing-machines in which the band holding together a sheaf of the grain to be threshed is cut and the bundle fed into the threshing-machine.

The objects of my invention are, first, to provide a band-cutter and feeder in which each bundle is fed separately and at a speed in accordance with its size; second, a band-cutter and feeder in which the speed at which the bundle is fed shall be self-regulating; third, a band-cutter and feeder by which two bundles of different size can be fed independently at the same time and the speed of the feed automatically regulated by the respective size of and bulk of the two bundles; fourth, a band-cutter and feeder which shall cut the bands and feed the top of each bundle first and shall loosen and spread and elongate the bundle before feeding same; fifth, a band-cutter and feeder divided into two halves either of which operates independently, and, sixth, a band-cutter and feeder which shall automatically regulate the amount of grain fed to the threshing-machine and the speed at which it is taken into the thresher. I attain these objects by the mechanism and construction illustrated in the drawings, in which—

Figure 2:
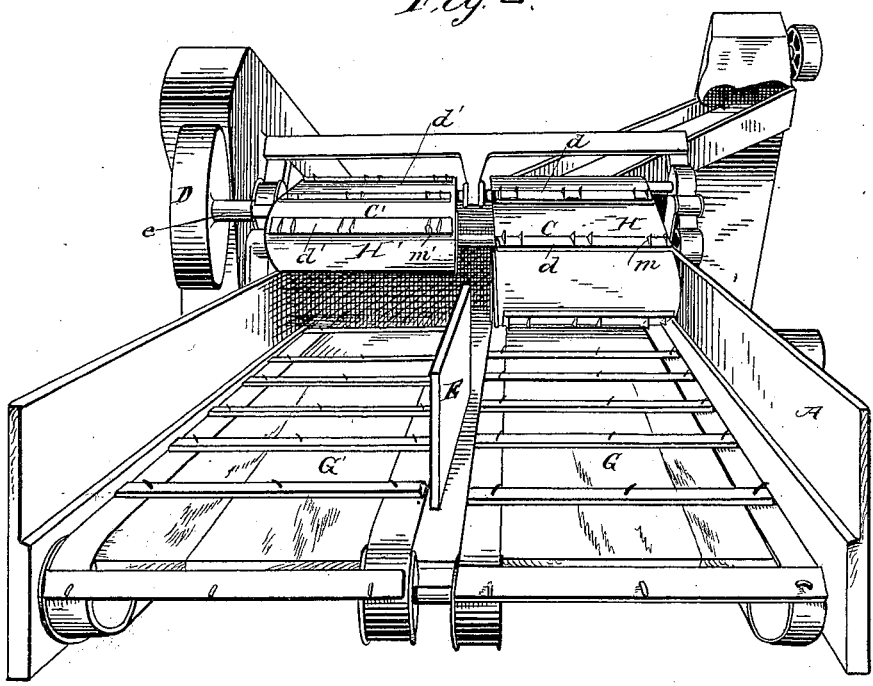

Figure 1 is a perspective view of the band-cutter attached to a threshing-machine as shown, and the point of view is from the right side. While same is attached to a threshing-machine, the latter is merely indicated in outline, as my invention can be attached in any suitable manner to any threshing-machine. Fig. 2 is a perspective view showing the front of the band-cutter and feeder.

Similar letters refer to similar parts in the two views.

In the drawings I have shown the band-cutter and feeder, the latter being indicated in outline, as it constitutes no part of my invention.

The band-cutter and feeder is shown as attached to a threshing-machine the cylinder of which is driven by the pulley F, (shown in diagram, and which is given to show the position of the band-cutter and feeder with reference to the threshing-machine.)

My device is provided with a table for carrying the sheaves of grain into the threshing-machine, and a side of same, A, is shown cut away, so that the raddles and mechanism for carrying the bundles may be seen. The table B bears upon its surface the raddles or carriers G G'. The board E divides the feeder into two parts.

The band-cutter and feeder is driven by the pulley-wheel D, which is suitably belted to a pulley conveniently placed upon the threshing-machine. In practice it is generally driven by a belt running from the pulley D to a pulley placed upon the shaft of the cylinder of the threshing-machine. The pulley D drives the shaft $e$. On the shaft $e$ are placed sprocket-wheels which carry the sprocket-chains $o\ o\ o'\ o'$, to which chains are attached the slats $d\ d$ and $d'\ d'$, upon which are seen the triangular band-cutting knives $m\ m$ and $m'\ m'$.

The raddles upon the band-cutters C and C' are continually driven by the revolutions of the shaft $e$ and run over the sprockets at uniform speed in the direction shown by the arrows.

The belt $g$ transfers power from the pulley $l$ to the pulley $i$, which in turn meshes with and drives the gear-wheel $h$, as shown in the drawings. The carriers or raddles G G' are driven by sprocket-wheels upon a shaft, which carries and which is driven by the gear-wheel $h$, and, as is seen, are driven in the direction indicated by the arrows at a much lower rate of speed than the raddles C C' upon the band-cutters above. The pulley-wheel $f$ is an idler-wheel running loosely upon a stud, which is supported from the frame of the band-cutter H by a link hinged at $p$ and a compression-spring attached at $q$. The office of the spring is to force the idler $f$ against the belt $g$ and cause the pulley $i$ to be set in motion. The tension of the spring is suitably regulated by a suitable screw at $q'$.

In the drawings the band-cutter H, nearest the point of view, is shown to be elevated for the purpose of bringing into view its mechanism and illustrating its action and operation. The band-cutter H' is resting in its normal position when ready to receive a bundle of grain to be fed into the threshing-machine. The band-cutter H', farther from point of view, is driven and operated precisely like the cutter H; but the pulleys and belt are not shown. In every respect it is a duplicate of the band-cutter H.

In Fig. 2 is shown a perspective view of the band-cutter and feeder from the front, showing the carriers G G', the band-cutters H and H', carrying the band-cutting raddles C C', upon the slats $d\ d\ d'\ d'$ of which are the band-cutting knives $m\ m$ and $m'\ m'$.

Taking Fig. 1, the operation of the mechanism is as follows: In describing the operation I will take the band-cutter H and the carrier G, their action being the same as H' and G'. The shaft $e$ actuates the pulley $l$, carrying the friction-belt $g$, which drives the pulley $i$, in turn driving the gear-wheel $h$ and operating the carrier G. The friction-belt $g$ engages the pulleys $i$ and $l$ loosely. The idler $f$, attached to the band-cutter H, as shown, presses against the belt $g$, tightening it enough to produce the necessary friction for driving the pulley $i$ or allowing the same to be released, as hereinafter described. The bundles are fed lengthwise upon the carrier G, which brings them under the cutters or knives upon the band-cutting raddles carried by H. The knives $m\ m$, rapidly moving in the direction indicated by the arrow, cut the bands and also draw the top of the bundle into the threshing-machine. Upon the slats of the carrier G (indicated at $c\ c$) are seen the teeth $k\ k$, of wire, and inclined backward from the direction of motion. The office of these teeth is to engage the bottom of each bundle and hold it. As is readily seen from the drawings, the speed of the raddle C is much greater than the speed of the carrier G. The purpose and effect of the higher speed of the band-cutting raddle C is to elongate each bundle and feed the top first. The top of the bundle is stripped off by the knives and raddle, while the bottom part, held by the teeth $k\ k$, is retarded by the slower motion of the carrier G. The speed at which the raddle C is driven, and consequently the rapidity at which bundles are fed to the threshing-machine, is regulated by the adjustment of the spring $q$, which forces the idler $f$ against the belt $g$. Increasing the compression of the spring increases the rapidity of feed. The normal position is shown by the cutter H'. When a large bundle is fed, the band-cutter H is elevated, the same being hung upon the shaft $e$. It will be raised not as high as the position of H in the drawings, but will travel upward by the same arc. The idler $f$ will be drawn away from the belt $g$. This will cause the pulley $i$ to revolve slower or stop, as the belt $g$ will slip upon the pulley $i$. The speed of the carrier G will be reduced and the feeding of the bundle thereupon be retarded; but the raddle C travels at constant speed, and the knives $m\ m$ and slats $d\ d$ will tear off the top of the bundle and feed same to the threshing-machine. The band-cutter H will be lowered gradually by the decreasing size of the bundle upon which it rests, and the idler will again press strongly against the belt $g$, and the pulley $i$ will again revolve, so actuating the gear-wheel $h$ and communicating motion to the carrier G.

From the drawings it will be seen that the band-cutters H and H' are independent as to their vertical motion. Such vertical motion is produced by the varying size of the bundles fed by the carrier G or G'. So the speeds of the carriers G and G' may be independently varied, such variations being caused and controlled by the vertical motion of the band-cutters H and H'. It will be seen that large bundles will be fed more slowly than small bundles, and as the two band-cutters and carriers are independent a large bundle may be fed upon carrier G, while a small one is taken by carrier G'; but I do not limit my invention to a double construction, but claim the right to use a single carrier and a single band-cutter, wider or narrower, instead of a double one, as all the elements of novelty are contained in either H and G or H' and G'.

In practice I construct the feeder and band-cutter either single or double.

I do not claim, broadly, the use of cutters and carriers actuated by the mechanism of the threshing-machine for the purpose of feeding bundles into the same and cutting the bands; but What I do claim as new, and desire to have protected by Letters Patent, is—

1. The combination of a carrier, an operating-shaft therefor, a pulley for operating said shaft, a band-cutter and feeder mounted to move toward and from said carrier, a drive-shaft therefor, a drive-pulley therefor, a belt loose on said two pulleys, and an idler-pulley adapted to be pressed against said belt by said band-cutter and feeder, whereby the movement of said carrier is controlled by the size of the bundle between the carrier and band-cutter and feeder, substantially as described.

2. The combination of a carrier, an operating-shaft therefor, a pulley geared to said shaft, a band-cutter and feeder, a drive-shaft therefor on which said band-cutter and feeder is adapted to swing toward and from said carrier, a pulley on said drive-shaft, a belt loose on said two pulleys, an idler-pulley carried by said band-cutter and feeder and adapted to be thereby pressed against said belt whereby the movement of said carrier is controlled by the size of the bundle between the carrier and the band-cutter and feeder, substantially as described.

3. The combination with a feed-table, of a shaft above the same, a band-cutter and feeder mounted to swing about said shaft and be driven thereby, a driving-belt working on a pulley on said shaft, a swinging link carried by said band-cutter and feeder, an idler-pulley on said link, and a spring for pressing said idler against said belt, substantially as described.

4. The combination with a feed-table, comprising a traveling raddle and means for operating the same, of a band-cutter and feeder comprising a frame and a traveling raddle carried thereby having cutting-knives, a shaft above the feed-raddle on which said frame is hinged and by which said raddle is driven, drive connections between said shaft and said raddle-operating means including a belt, an idler-pulley movably mounted on said frame, and means for forcing said idler-pulley against said belt, substantially as described.

In testimony whereof I affix my signature in presence of two witnesses.

GEORGE F. CONNER.

Witnesses:
H. B. HOYT,
C. A. HARRINGTON.